(12) United States Patent
Ishida et al.

(10) Patent No.: US 9,606,471 B2
(45) Date of Patent: *Mar. 28, 2017

(54) IMAGE FORMING APPARATUS

(71) Applicant: Ricoh Company, Ltd., Tokyo (JP)

(72) Inventors: Masaaki Ishida, Kanagawa (JP);
Atsufumi Omori, Kanagawa (JP);
Muneaki Iwata, Kanagawa (JP);
Hayato Fujita, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/948,867

(22) Filed: Nov. 23, 2015

(65) Prior Publication Data
US 2016/0147171 A1 May 26, 2016

(30) Foreign Application Priority Data

Nov. 25, 2014 (JP) ................................. 2014-237493

(51) Int. Cl.
*G03G 15/043* (2006.01)
*G06K 15/12* (2006.01)
(Continued)

(52) U.S. Cl.
CPC ........... *G03G 15/043* (2013.01); *G06K 15/12* (2013.01); *G06K 15/16* (2013.01); *H04N 1/40056* (2013.01); *H04N 1/4092* (2013.01)

(58) Field of Classification Search
CPC .................... G03G 15/043; H04N 1/40056
See application file for complete search history.

(56) References Cited

U.S. PATENT DOCUMENTS

| 4,754,291 A | * | 6/1988 | Horikawa | .......... H04N 1/40037 |
| | | | | 347/252 |
| 4,905,023 A | * | 2/1990 | Suzuki | ................ H04N 1/4005 |
| | | | | 347/252 |

(Continued)

FOREIGN PATENT DOCUMENTS

| EP | 2 802 137 A1 | 11/2014 |
| JP | 2005-193540 | 7/2005 |

(Continued)

OTHER PUBLICATIONS

Extended European Search Report issued Apr. 5, 2016 in Patent Application No. 15195866.7.

(Continued)

*Primary Examiner* — David Gray
*Assistant Examiner* — Carla Therrien
(74) *Attorney, Agent, or Firm* — Oblon, McClelland, Maier & Neustadt, L.L.P.

(57) ABSTRACT

An image forming apparatus for forming an image by scanning an image bearer with light modulated in accordance with image information includes a light source configured to emit the light and a control device configured to control the light source in accordance with the image information. The control device sets light emission duration of the light source for forming a particular pixel in the image to be shorter than light emission duration of the light source for forming a normal pixel, which is a pixel other than the particular pixel irk the image, and sets light emission intensity of the light source for forming the particular pixel to be higher than light emission intensity of the light source for forming the normal pixel.

12 Claims, 12 Drawing Sheets

(51) Int. Cl.
*G06K 15/16* (2006.01)
*H04N 1/40* (2006.01)
*H04N 1/409* (2006.01)

(56) References Cited

U.S. PATENT DOCUMENTS

| | | | |
|---|---|---|---|
| 5,546,111 A | 8/1996 | Maeda | |
| 5,784,091 A * | 7/1998 | Ema | G06K 15/1209 347/131 |
| 5,973,719 A * | 10/1999 | Araki | H04N 1/4005 347/131 |
| 6,498,617 B1 | 12/2002 | Ishida et al. | |
| 8,212,847 B2 * | 7/2012 | Kella | H04N 1/40025 347/131 |
| 8,237,760 B2 | 8/2012 | Nihei et al. | |
| 8,310,516 B2 | 11/2012 | Tanabe et al. | |
| 8,334,887 B2 * | 12/2012 | Gentner | B41J 2/473 347/224 |
| 8,687,036 B2 | 4/2014 | Ishida et al. | |
| 9,035,988 B2 | 5/2015 | Nihei et al. | |
| 2003/0025785 A1 | 2/2003 | Nihei et al. | |
| 2003/0067533 A1 | 4/2003 | Omori et al. | |
| 2003/0156184 A1 | 8/2003 | Suzuki et al. | |
| 2004/0032482 A1 | 2/2004 | Ozasa et al. | |
| 2004/0036762 A1 | 2/2004 | Nihei et al. | |
| 2004/0125199 A1 | 7/2004 | Omori et al. | |
| 2005/0089069 A1 | 4/2005 | Ozasa et al. | |
| 2005/0099489 A1 | 5/2005 | Nihei et al. | |
| 2005/0146596 A1 | 7/2005 | Nihei et al. | |
| 2005/0219354 A1 | 10/2005 | Omori et al. | |
| 2005/0243163 A1 | 11/2005 | Ozasa et al. | |
| 2006/0285186 A1 | 12/2006 | Ishida et al. | |
| 2007/0030548 A1 | 2/2007 | Nihei et al. | |
| 2007/0091163 A1 | 4/2007 | Omori et al. | |
| 2007/0132828 A1 | 6/2007 | Ishida et al. | |
| 2007/0242127 A1 | 10/2007 | Omori et al. | |
| 2007/0285495 A1 | 12/2007 | Nihei et al. | |
| 2008/0012933 A1 | 1/2008 | Nihei et al. | |
| 2008/0042700 A1 | 2/2008 | Nihei et al. | |
| 2008/0088893 A1 | 4/2008 | Ishida et al. | |
| 2008/0123160 A1 | 5/2008 | Omori et al. | |
| 2008/0218813 A1 | 9/2008 | Tanabe et al. | |
| 2008/0225106 A1 | 9/2008 | Omori et al. | |
| 2008/0239336 A1 | 10/2008 | Tanabe et al. | |
| 2008/0267663 A1 | 10/2008 | Ichii et al. | |
| 2009/0167837 A1 | 7/2009 | Ishida et al. | |
| 2009/0174915 A1 | 7/2009 | Nihei et al. | |
| 2009/0195635 A1 | 8/2009 | Ishida et al. | |
| 2009/0231656 A1 | 9/2009 | Suzuki et al. | |
| 2009/0303451 A1 | 12/2009 | Miyake et al. | |
| 2010/0119262 A1 | 5/2010 | Omori et al. | |
| 2010/0214637 A1 | 8/2010 | Nihei et al. | |
| 2011/0199657 A1 | 8/2011 | Ishida et al. | |
| 2011/0228037 A1 | 9/2011 | Omori et al. | |
| 2011/0304683 A1 | 12/2011 | Ishida et al. | |
| 2012/0099165 A1 | 4/2012 | Omori et al. | |
| 2012/0189328 A1 | 7/2012 | Suzuki et al. | |
| 2012/0293783 A1 | 11/2012 | Ishida et al. | |
| 2013/0033558 A1 | 2/2013 | Akatsu et al. | |
| 2014/0139603 A1 | 5/2014 | Fujita et al. | |
| 2014/0139605 A1 | 5/2014 | Fujita et al. | |
| 2014/0176656 A1 | 6/2014 | Omori et al. | |
| 2014/0268186 A1 | 9/2014 | Iwata et al. | |
| 2014/0327938 A1 | 11/2014 | Ishida et al. | |
| 2014/0333940 A1 | 11/2014 | Iwata et al. | |
| 2014/0333941 A1 | 11/2014 | Iwata et al. | |
| 2015/0125171 A1 | 5/2015 | Iwata et al. | |
| 2015/0156373 A1 | 6/2015 | Fujita et al. | |
| 2015/0180200 A1 | 6/2015 | Fujita et al. | |
| 2015/0251442 A1 | 9/2015 | Ishida et al. | |

FOREIGN PATENT DOCUMENTS

JP 2015-104918 6/2015
WO WO 2008/033126 A1 3/2008

OTHER PUBLICATIONS

U.S. Appl. No. 14/725,343, filed May 29, 2015.
U.S. Appl. No. 14/796,385, filed Jul. 10, 2015.

\* cited by examiner

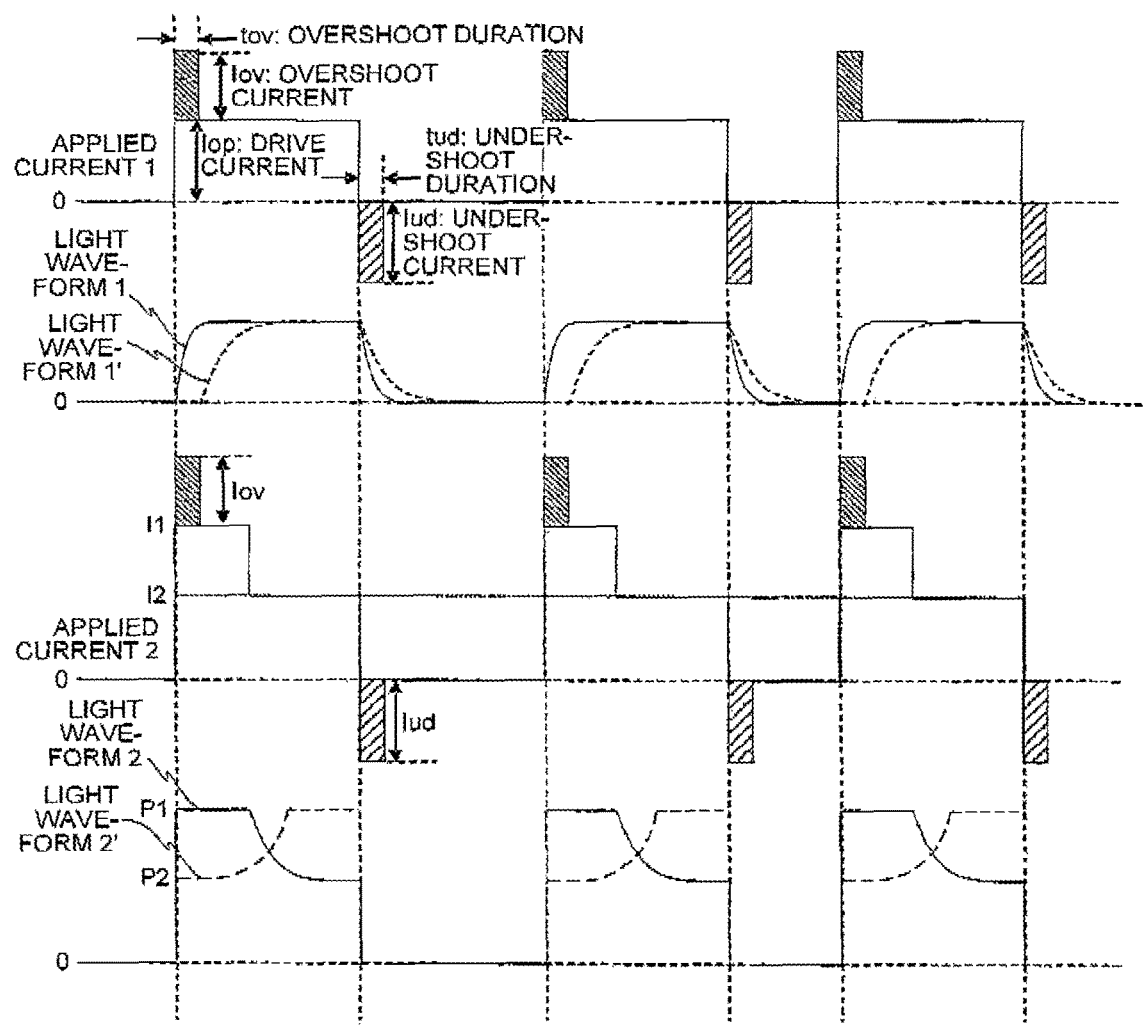

IMAGE FORMING APPARATUS

CROSS-REFERENCE TO RELATED APPLICATIONS

The present application claims priority to and incorporates by reference the entire contents of Japanese Patent Application No. 2014-237493 filed in Japan on Nov. 25, 2014.

BACKGROUND OF THE INVENTION

1. Field of the Invention

The present invention relates generally to image forming apparatuses and, more particularly, to an image forming apparatus configured to form an image by scanning an image bearer with light modulated in accordance with image information.

2. Description of the Related Art

Image forming apparatuses configured to form an image by scanning an image bearer with light modulated in accordance with image information are conventionally known. An example of such an image forming apparatus is disclosed in Japanese Laid-open Patent Publication No. 2005-193540.

However, the image forming apparatus disclosed in Japanese Laid-open Patent Publication No. 2005-193540 can, disadvantageously, form an image having uneven density.

SUMMARY OF THE INVENTION

It is an object of the present invention to at least partially solve the problems in the conventional technology.

According to exemplary embodiments of the present invention, there is provided an image forming apparatus for forming an image by scanning an image bearer with light modulated in accordance with image information, the image forming apparatus comprising: a light source configured to emit the light; and a control device configured to control the light source in accordance with the image information, the control device setting light emission duration of the light source for forming a particular pixel in the image to be shorter than light emission duration of the light source for forming a normal pixel, the normal pixel being a pixel other than the particular pixel in the image, and setting light emission intensity of the light source for forming the particular pixel to be higher than light emission intensity of the light source for forming the normal pixel.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 12 is a diagram illustrating waveforms of applied currents 1 and 2, light waveforms 1 and 1', and light waveforms 2 and 2'.

DETAILED DESCRIPTION OF THE PREFERRED EMBODIMENTS

Exemplary embodiments of the present invention are described below with reference to the accompanying drawings.

Figure 1:
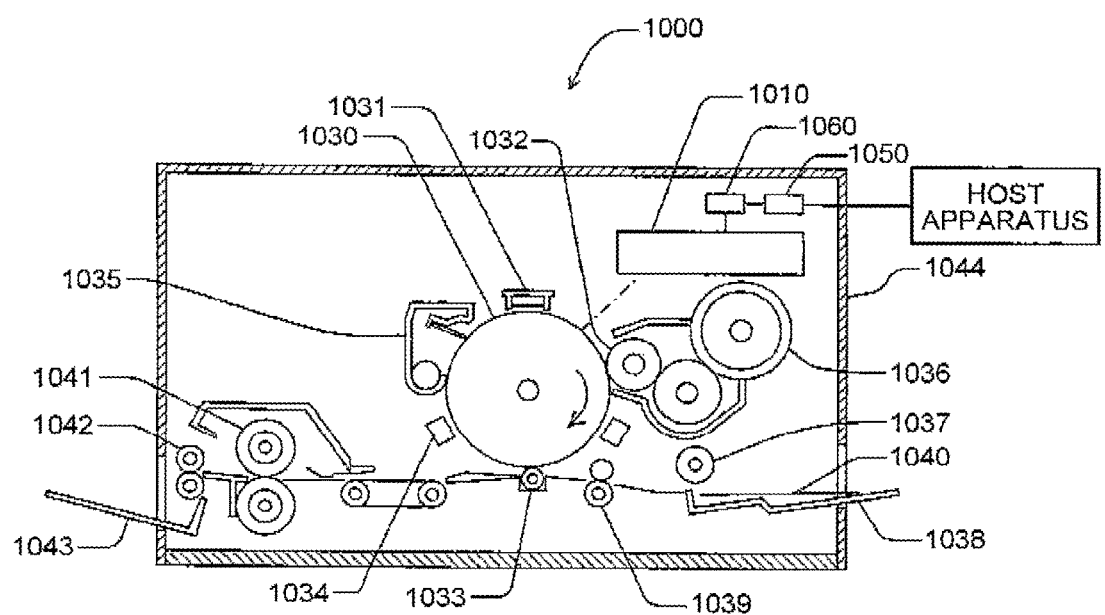
FIG. 1 is a diagram illustrating a schematic configuration of a laser printer according to an embodiment of the present invention.

An embodiment of the present invention is described below with reference to FIGS. 1 to 1B. FIG. 1 illustrates a schematic configuration of a laser printer 1000 according to the embodiment.

The laser printer 1000 includes an optical scanning device 1010, a photoconductor drum 1030, a charging charger 1031, a developing roller 1032, a transfer charger 1033, a charge neutralizing unit 1034, a cleaning unit 1035, a toner cartridge 1036, a paper feeding roller 1037, a paper feeding tray 1038, a pair of registration rollers 1039, a fixing roller 1041, a paper ejection roller 1042, a paper ejection tray 1043, a communication control device 1050, and a printer control device 1060. The printer control device 1060 provides overall control of these elements. These are housed at predetermined positions in a printer casing 1044.

The communication control unit 1050 controls communications between the laser printer 1000 and a host apparatus (e.g., a personal computer) via a network or the like.

The photoconductor drum 1030 is a cylindrical member having a photosensitive layer formed on its surface. Put another way, the surface of the photoconductor drum 1030 is a to-be-scanned surface. The photoconductor drum 1030 is configured to rotate in the direction indicated by an arrow in FIG. 1.

Each of the charging charger 1031, the developing roller 1032, the transfer charger 1033, the charge neutralizing unit 1034, and the cleaning unit 1035 is arranged near the surface of the photoconductor drum 1030. The charging charger 1031, the developing roller 1032, the transfer charger 1033, the charge neutralizing unit 1034, and the cleaning unit 1035 are arranged in this order along the rotating direction of the photoconductor drum 1030.

The charging charger 1031 uniformly charges the surface of the photoconductor drum 1030.

The optical scanning device 1010 forms an electrostatic latent image on the surface of the photoconductor drum 1030 in accordance with image information (image data) fed from the host apparatus by scanning the surface of the photoconductor drum 1030 charged by the charging charger 1031 with laser light modulated in accordance with the image information. As the photoconductor drum 1030 rotates, the formed electrostatic latent image moves toward the developing roller 1032. A configuration of the optical scanning device 1010 will be described later.

The toner cartridge 1036 contains therein toner, which is to be supplied to the developing roller 1032.

The developing roller 1032 causes the toner supplied from the toner cartridge 1036 to be deposited on the electrostatic latent image formed on the surface of the photoconductor drum 1030, thereby making the image information visible. As the photoconductor drum 1030 rotates, the electrostatic latent image with the toner deposited thereon (hereinafter, sometimes referred to as "toner image" for convenience) moves toward the transfer charger 1033.

Sheets of recording paper 1040 are stored in the paper feeding tray 1038. The paper feeding roller 1037 is arranged near the paper feeding tray 1038. The paper feeding roller 1037 picks up the recording paper 1040 one sheet by one sheet from the paper feeding tray 1038 and conveys the recording paper 1040 to the pair of registration rollers 1039. The pair of registration rollers 1039 temporarily holds the recording paper 1040 picked up by the paper feeding roller 1037 and delivers the recording paper 1040 to a space between the photoconductor drum 1030 and the transfer charger 1033 timed to the rotation of the photoconductor drum 1030.

A voltage, which is opposite in polarity to the toner, is applied to the transfer charger 1033 to electrically attract the toner on the surface of the photoconductor drum 1030 onto the recording paper 1040. This voltage causes the toner image on the surface of the photoconductor drum 1030 to be transferred onto the recording paper 1040. The recording paper 1040, onto which the toner image is transferred, is delivered to the fixing roller 1041.

Heat and a pressure applied to the recording paper 1040 at the fixing roller 1041 fix the toner onto the recording paper 1040. The recording paper 1040 having undergone the fixing is delivered by the paper ejection roller 1042 to the paper ejection tray 1043 to be piled one sheet by one sheet on the paper ejection tray 1043.

The charge neutralizing unit 1034 neutralizes the charges on the surface of the photoconductor drum 1030.

The cleaning unit 1035 removes toner (residual toner) left on the surface of the photoconductor drum 1030. The surface of the photoconductor drum 1030, from which the residual toner is removed, returns to a position where the surface faces the charging charger 1031.

Figure 2:
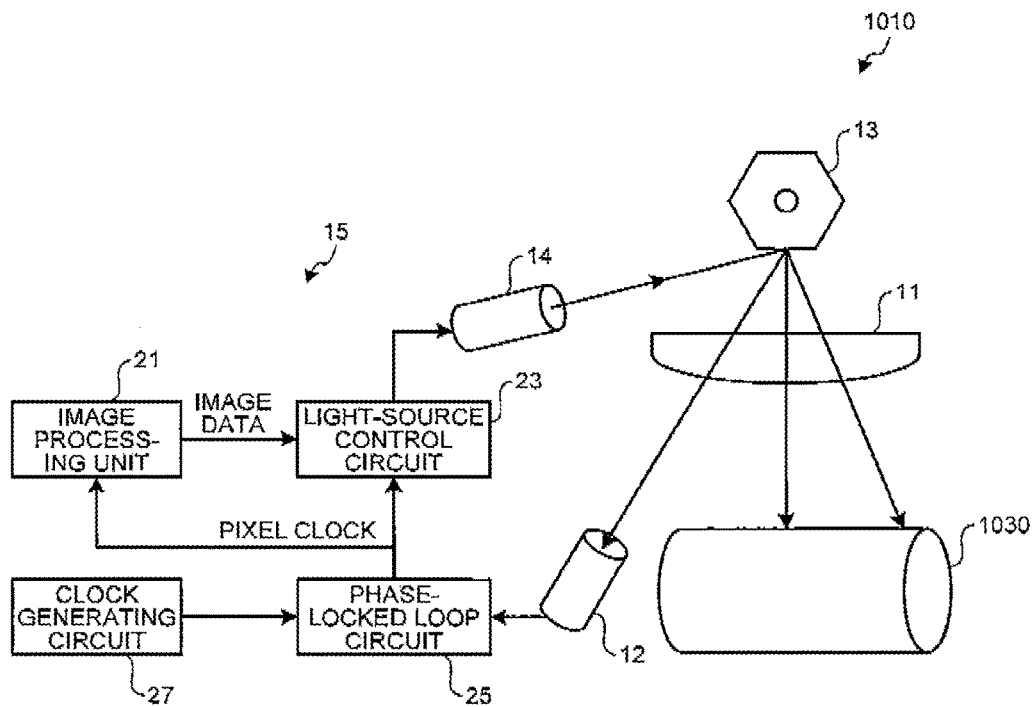
FIG. 2 is an explanatory diagram of the optical scanning device illustrated in FIG. 1.

The configuration of the optical scanning device 1010 is described below. The optical scanning device 1010 includes, for example, an LD (laser diode) 14 as a light source, a polygon mirror 13, a scanning lens 11, a PD (photodetector) 12 as a light-receiving element, and a scanning control device 15, as illustrated in FIG. 2. These are attached to predetermined positions in a housing (not shown).

Hereinafter, for convenience, a direction corresponding to the main-scanning direction is referred to as "main-scanning-corresponding direction"; a direction corresponding to the sub-scanning direction is referred to as "sub-scanning-corresponding direction".

The LD 14, which may also be referred to as an edge-emitting laser, emits laser light toward a deflecting reflection surface of the polygon mirror 13.

The polygon mirror 13 has, for example, six facets, each serving as the deflecting reflection surface, with an inscribed circle of 18 millimeter diameter. The polygon mirror 13 deflects the laser light emitted from the LD 14 while rotating about an axis parallel to the sub-scanning-corresponding direction at a constant velocity.

An optical system (which may also be referred to as a pre-deflector optical system) for imaging forming the laser light emitted from the LD 14 with respect to the sub-scanning-corresponding direction at a position near the deflecting reflection surface of the polygon mirror 13 may be arranged between the LD 14 and the polygon mirror 13. Examples of an optical element making up the pre-deflector optical system include a coupling lens, an aperture member, a cylindrical lens, and a reflection mirror.

The scanning lens 11 is arranged on an optical path of the laser light deflected by the polygon mirror 13. The laser light passed through the scanning lens 11 irradiates (is condensed onto) the surface of the photoconductor drum 1030 to form a light spot. As the photoconductor drum 1030 rotates, the light spot moves in the longitudinal direction of the photoconductor drum 1030. Put another way, the light spot scans the surface of the photoconductor drum 1030. The direction, in which the light spot moves, is the "main-scanning direction". The rotating direction of the photoconductor drum 1030 is the "sub-scanning direction".

An optical system arranged on the optical path between the polygon mirror 13 and the photoconductor drum 1030 may also be referred to as a scanning optical system in the present embodiment, the scanning optical system is the scanning lens 11. The scanning optical system may include a plurality of scanning lenses. At least one folding mirror may be arranged on at least one of the optical path between the polygon mirror 13 and the scanning optical system, and the optical path between the photoconductor drum 1030 and the scanning optical system.

The PD 12 is arranged on the optical path of the laser light deflected by the polygon mirror 13 and passed through the scanning lens 11. The PD 12 feeds a result of receiving the laser light to the scanning control device 15. The PD 12 may be arranged either downstream in the scanning direction or upstream in the scanning direction of the photoconductor drum 1030.

Thus, the laser light emitted from the LD 14 is deflected by the rotating polygon mirror 13 and, after passing through the scanning leas 11, irradiates the photoconductor drum 1030, which is a to-be-scanned medium. The emitted laser light forms, on the photoconductor drum 1030, a light spot, which forms an electrostatic latent image on the photoconductor drum 1030.

The laser light deflected by the polygon mirror 13 is incident on the PD 12 each time scanning one line is completed. Upon receiving the laser light, the PD 12 converts the amount of the received light into an electrical signal and feeds the electrical signal to a phase-locked loop circuit 25, which will be described later.

The scanning control device 15 may include, for example, an image processing unit 21, a light-source control circuit 23, the phase-locked loop circuit 25, and a clock generating circuit 27.

Upon receiving the electrical signal, the phase-looked loop circuit 25 generates a pixel clock for a next one line. The clock generating circuit 27 feeds, to the phase-locked loop circuit 25, a high-frequency clock signal, for phase synchronization of the pixel clock. The pixel clock generated by the phase-locked loop circuit 25 is supplied to the image processing unit 21 and to the light-source control circuit 25.

The image processing unit 21 performs predetermined processing on image data (image information) fed from a host apparatus and supplies the processed image data to the light-source control circuit 23 in accordance with the pixel clock fed from the phase-locked loop circuit 25.

The light-source control circuit 23 drives the LD 14 in accordance with the pixel clock, fed from the phase-locked loop circuit 25 and the image data fed from the image processing unit 21. Consequently, an electrostatic latent image is formed in accordance with the image information on the photoconductor drum 1030.

Figure 3:
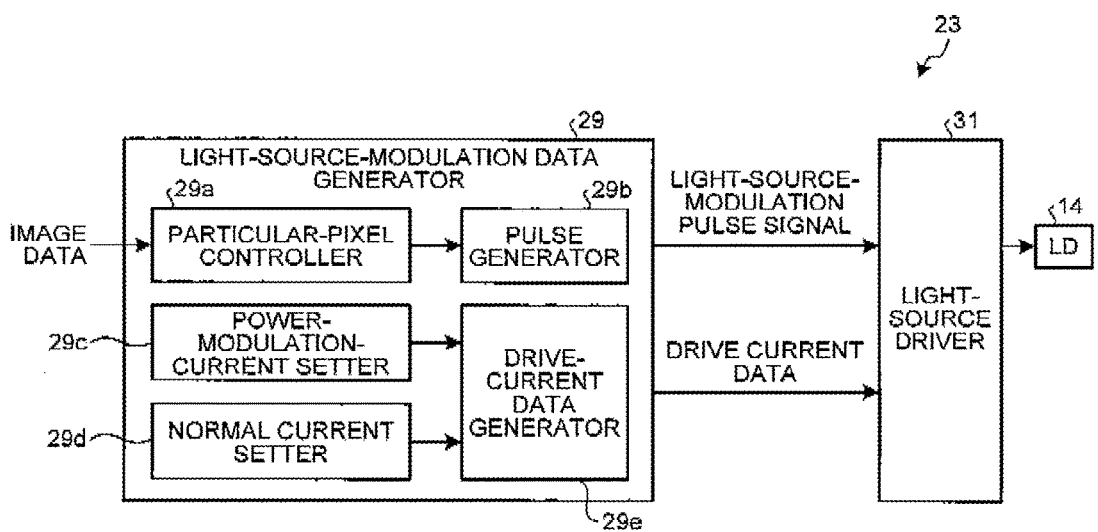
FIG. 3 is an explanatory diagram of a configuration of a light-source control circuit.

The light-source control circuit 23 is described in detail below. As illustrated in FIG. 3, the light-source control circuit 23 includes a light-source-modulation data generator 29 and a light-source driver 31.

The light-source-modulation data generator 29 may include, for example, a particular-pixel controller 29a, a pulse generator 29b, a power-modulation-current setter 29c, a normal current setter 29d, and a drive-current data generator 29e.

The particular-pixel controller 29a detects a particular pixel(s) (e.g., a pixel included in an edge portion) in image data fed from the image processing unit 21, generates a control signal for controlling light-on period and light-on timing of the LD 14 for forming the particular pixel, and transmits the control signal to the pulse generator 29b.

The pulse generator 29b generates a light-source-modulation pulse signal for on/off control of the LD 14 based on the control signal transmitted from the particular-pixel controller 29a and transmits the light-source-modulation pulse signal to the light-source driver 31.

The power-modulation-current setter 290 sets a value of electric current (hereinafter, "current value") required by the LD 14 to emit light for forming the particular pixel and transmits the set value to the drive-current data generator 29e. The current value may be, for example, N (N>1) times higher than a value of electric current required by the LD 14 to emit light for forming a normal pixel, which is a pixel other than the particular pixel in the image data.

The normal current setter 29d sets the value of electric current required by the LD 14 to emit light for forming the normal pixel and transmits the set value to the drive-current data generator 29e.

The drive-current data generator 29e generates, based on the set values transmitted from the power-modulation-current setter 29c and the normal current setter 29d, drive current data for controlling the amount of drive current (drive current value) to be supplied to the LD 14 and feeds the drive current data to the light-source driver 31.

Figure 4:
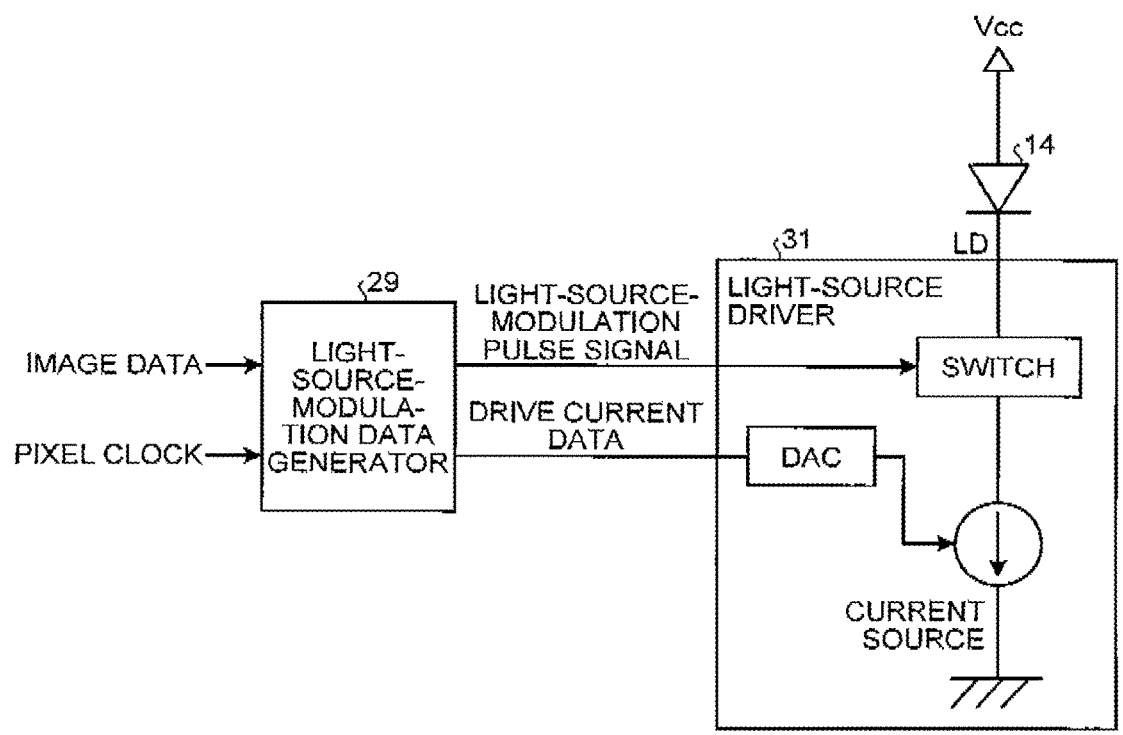
FIG. 4 is another explanatory diagram of the configuration of the light-source control circuit.

As illustrated in FIG. 4, the light-source driver 31 drives the LD 14 in accordance with the light-source-modulation pulse signal and the drive current data fed from the light-source-modulation data generator 29.

In the present embodiment, for brevity of description, it is assumed that the light source is a single LD (laser diode). However, in practice, the light source may alternatively be an LDA (laser diode array) including a plurality of LDs arranged in a linear or two-dimensional array or, further alternatively, a single VCSEL (vertical-cavity surface-emitting laser) or a VCSELA (VCSEL array) including a plurality of VCSELs arranged in a linear or two-dimensional array.

The current source of the LD 14 is configured to supply a forward current to the LD 14 in accordance with the light-source-modulation pulse signal (see FIG. 4).

The present embodiment is configured to be capable of digitally setting the drive current value using a DAC (digital-to-analog converter) code. Switching on/off a switch (e.g., a transistor) in accordance with the light-source-modulation pulse signal causes current supply from the current source to the LD 14 to be switched on/off. Thus, light emission control for a desired light-on/off pattern is enabled (FIG. 4).

A method of generating, by the pulse generator 29b, a light-source-modulation pulse signal is described below. The light-source-modulation pulse signal is a signal for controlling on/off (light-on/light-off) of the LD 14. More specifically, when the light-source-modulation pulse signal is at H (high) level, the LD 14 is on, while the same is at L (low) level, the LD 14 is off.

The particular-pixel controller 29a performs pattern matching on image data fed from the image processing unit 21, thereby detecting a particular pixel(s) (e.g., a pixel included in an edge portion). If object information indicating an image attribute is given, this pattern matching is performed only on an image area that is necessary to be performed pattern matching, which is indicated by the image attribute, thereby detecting the particular pixel(s). Examples of the "image attribute" include text, picture, and shape.

Thereafter, the particular-pixel controller 29a generates a light-source-modulation pulse signal by controlling (setting) light-on timing and light-on period of the LD 14 forming the particular pixel. Note that setting "the light-on timing of the LD 14 forming the particular pixel" means specifying at which phase in the particular pixel the LD 14 is to be lit while controlling a pulse width.

Figure 5A:
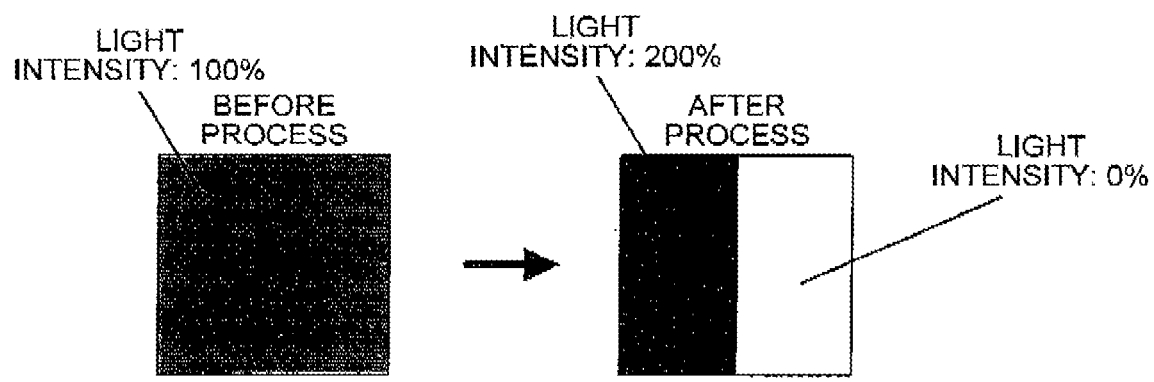
FIGS. 5A to 5C are respectively explanatory diagrams of specific examples of a process for adjusting light emission duration and light emission intensity for forming a particular pixel.
Figure 5B:
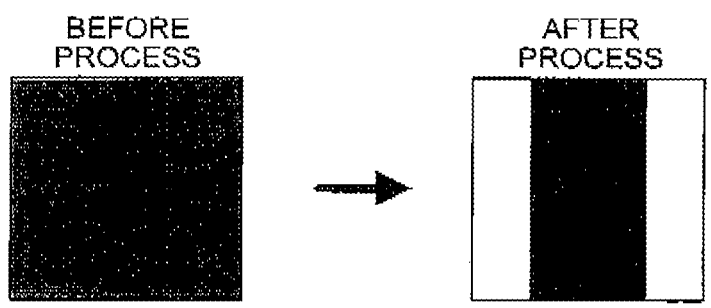
Figure 5C:
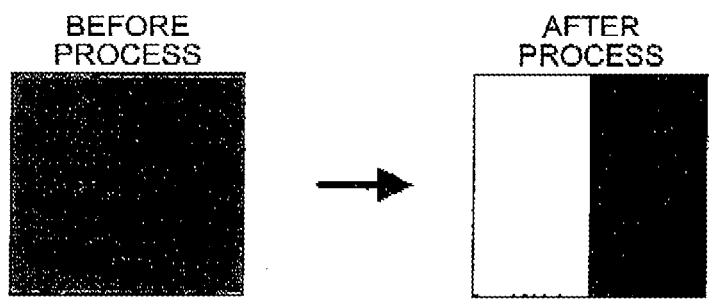

For example, FIG. 5A illustrates a particular pixel before and after a process of setting the pulse width and the phase to 50% duty cycle and left phase, respectively. FIG. 5B illustrates a particular pixel before and after a process of setting the pulse width and the phase to 50% duty cycle and center phase, respectively. FIG. 5C illustrates a particular pixel before and after a process of setting the pulse width and the phase to 50% duty cycle and right phase, respectively.

A method of generating, by the drive-current data generator 29e, drive current data is described below. The drive current data is a signal indicating a size of drive current (pulse amplitude) to be supplied to the LD 14 or, in other words, indicating the intensity of light energy (hereinafter, "light intensity") to be output from the LD 14.

The drive-current data generator 29e reads out normal-light-intensity current data first. The "normal-light-intensity current data" is data for determining predetermined light intensity, which is intensity of light for the normal pixel. The "predetermined light intensity" is light intensity, at which an appropriate amount of toner for forming a solid image can be deposited by optically scanning the photoconductor drum 1030.

Thereafter, the drive-current data generator 29e reads out power-modulation-light-intensity current data. The "power-modulation-light-intensity current data" is data for determining light intensity for the particular pixel. The light intensity in set based on the normal-light-intensity current data. If the normal-light-intensity current data should be changed, the power-modulation-light-intensity current data is also adjusted accordingly.

For instance, the light intensity set based on the power-modulation-light-intensity current data may be set to an integral multiple, for example, of the light intensity set based on the normal-light-intensity current data. The multiplication factor is preferably determined based on characteristics of the photoconductor drum, the toner, developing, and the like.

Thereafter, the drive-current data generator 29e generates drive current data made up from the power-modulation-light-intensity current data for duration of the particular pixel and the normal-light-intensity current data for duration of the normal pixel with reference to the pixel clock.

In the present embodiment, as described below by way of specific examples, it is assumed that a redetermined process (process of adjusting emission duration and light emission intensity) is performed on an edge portion(s) of an image indicated by image data.

Figure 6A:
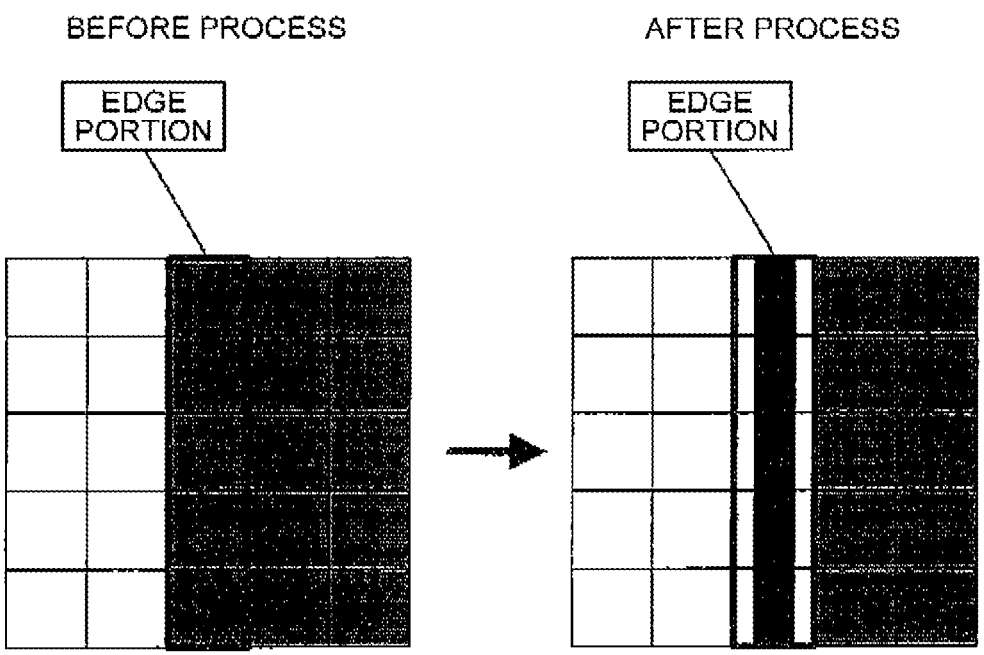
FIGS. 6A and 6B are respectively explanatory diagrams of specific examples of a process for adjusting light emission duration and light emission intensity for an edge portion of an image.
Figure 6B:
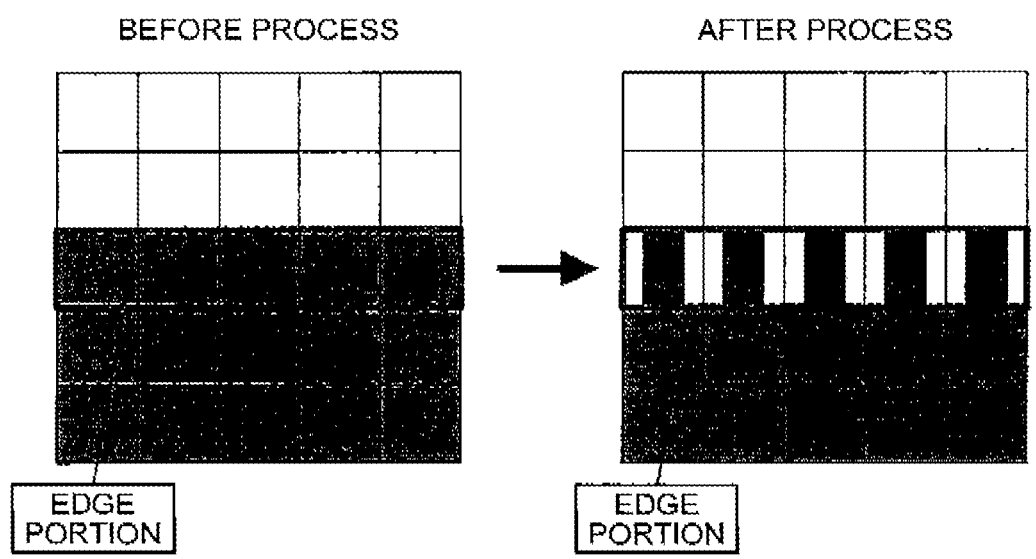

An example of a process performed on a plurality of particular pixels making up an edge portion in the main-scanning direction of an image indicated by image data and an example of a process performed on a plurality of particular pixels making up an edge portion in the sub-scanning direction of an image indicated by image data are illustrated in FIGS. 6A and 63, respectively. FIG. 6A is an enlarged view of an area including the edge portion in the main-scanning direction of the image indicated by the image data. FIG. 63 is an enlarged view of an area including the edge portion in the sub-scanning direction of the image indicated by the image data.

Referring to the example, the width of each particular pixel in the main-scanning direction is reduced and, furthermore, the LD 14 is caused to emit light with light emission intensity (radiant intensity) higher than normal light emission intensity. More specifically, the width of the each particular pixel in the main-scanning direction is set to ½ of that of the normal pixel, and the light emission intensity is set to 200% of that of the normal pixel. The phase of the each particular pixel is set to the center phase.

Figure 7A:
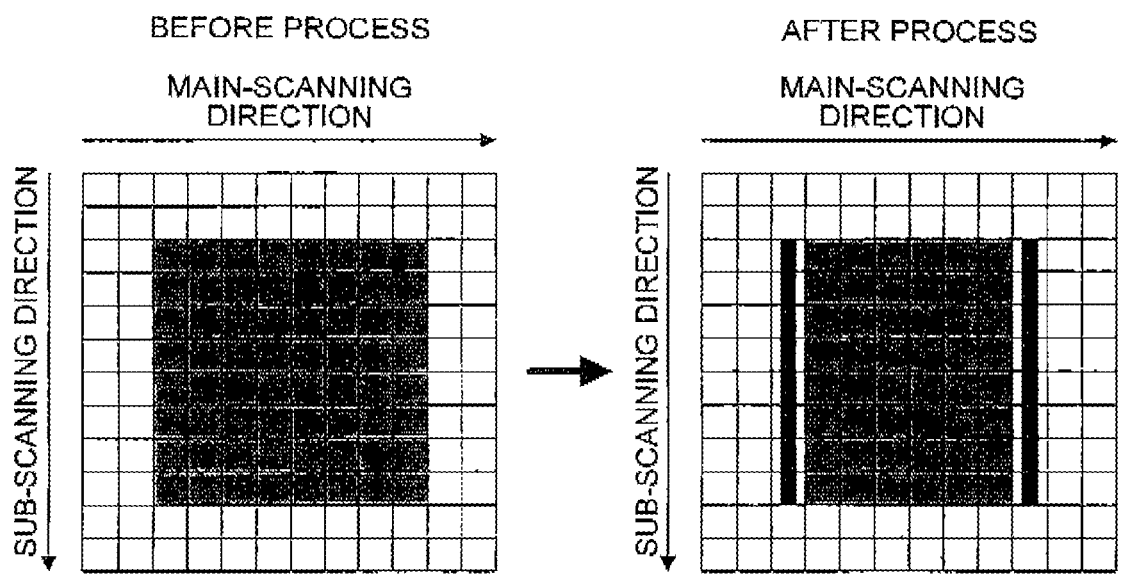
FIGS. 7A and 7B are respectively explanatory diagrams of specific examples of a process for adjusting light emission duration and light emission intensity for edge portions of a solid image.
Figure 7B:
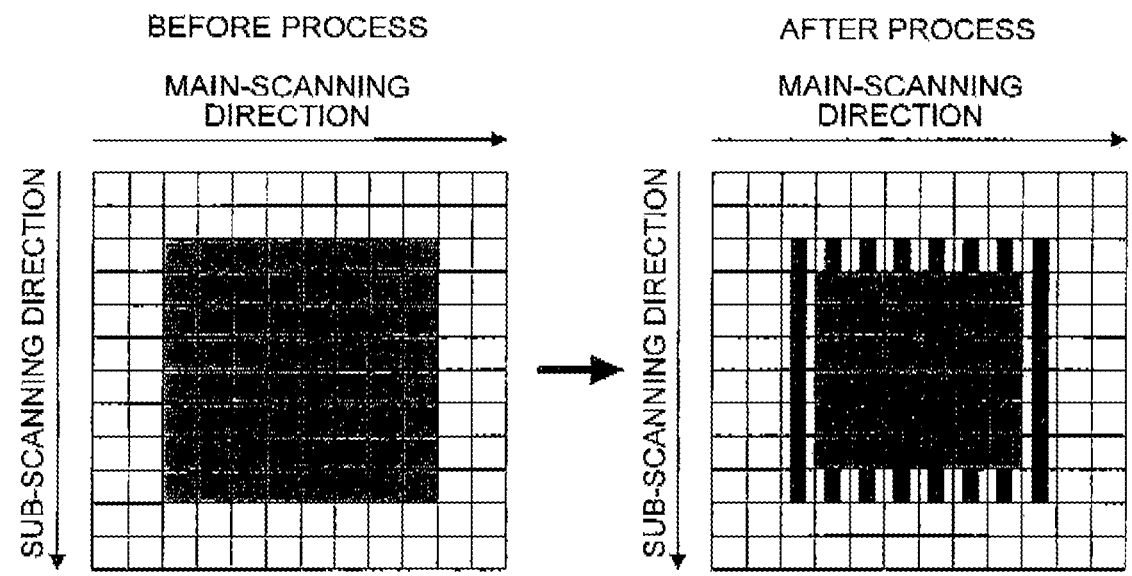

FIGS. 7A and 7B are specific examples of certain image data (representing a solid image, for example) before and after the process. FIG. 7A illustrates an example where the process is performed only on edges in the main-scanning direction. FIG. 7B illustrates an example where the process is performed on edge portions in the main-scanning direction and edge portions in the sub-scanning direction.

Figure 8A:
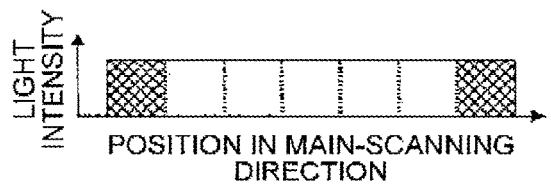
FIGS. 8A to 8D are explanatory diagrams of specific examples of a process for adjusting light emission duration and light emission intensity for one pixel in each edge portion in the main-scanning direction of an image.

FIG. 8A illustrates a light intensity waveform of an image whose edge portions in the main-scanning direction have not undergone the process.

Figure 8B:
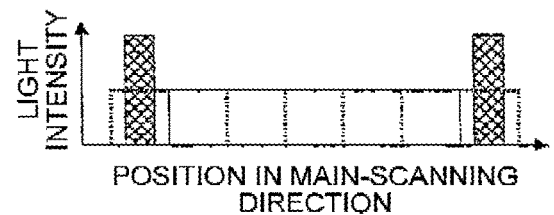

FIG. 8B illustrates a light intensity waveform of an image who edge portions (each corresponding to one particular pixel) in the main-scanning direction have undergone the process. The double-hatched portions indicate the edge portions. In FIG. 8B, the particular pixels in the each edge portion are formed with 50% duty cycle and 200% of the normal light intensity. The phase is the center phase.

Figure 8C:
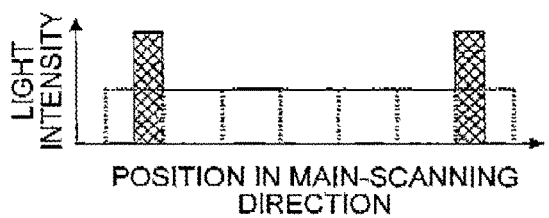

FIG. 8C illustrates a light intensity waveform obtained by shifting the phase of FIG. 8B toward the center of the image. Shifting the phase in this manner eliminates a light-off period at a midpoint in image data, thereby making it possible to reduce an area, in which the electric field is weak and therefore toner deposition is unstable.

Figure 8D:
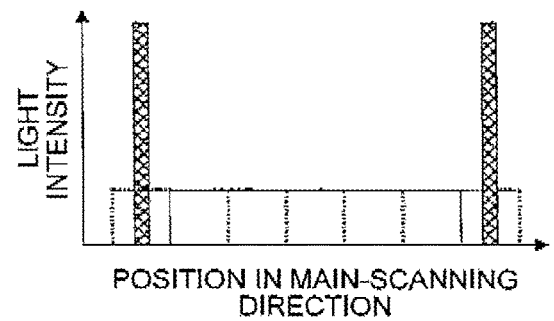

FIG. 8D illustrates an image, in which particular pixels in edge portions in the main-scanning direction are formed with the same phase as FIG. 8B, 25% duty cycle, and 400% of the normal light intensity. In this case, the edge portions are further enhanced. Accordingly, toner scattering can be prevented, which leads to an increase in sharpness and density stabilization.

Figure 9A:
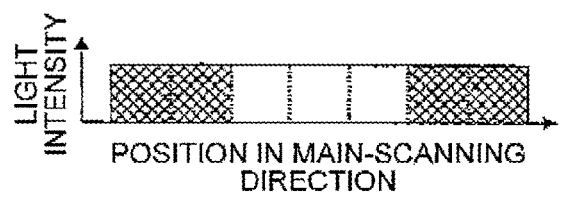
FIGS. 9A to 9D are explanatory diagrams of specific examples of a process for adjusting light emission duration and light emission intensity for two pixels in each edge portion in the main-scanning direction of an image.

FIG. 9A illustrates a light intensity waveform of an image whose edge portions in the main-scanning direction have not undergone the process.

Figure 9B:
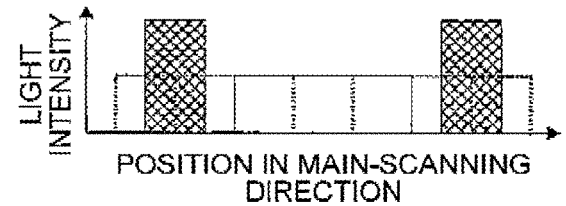

FIG. 9B illustrates a light intensity waveform of an image whose edge portions (each corresponding to two particular pixels) in the main-scanning direction have undergone the process. The double-hatched portions indicate the edge portions. In FIG. 9B, the particular pixels in the each edge portion are formed with 50% duty cycle and 200% of the normal light intensity. The phase is the center phase.

Figure 9C:
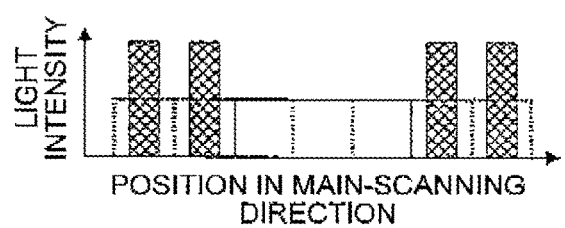

FIG. 9C illustrates a light intensity waveform obtained by shifting the phase of FIG. 9B toward the center of each particular pixel in the edge portions.

Figure 9D:
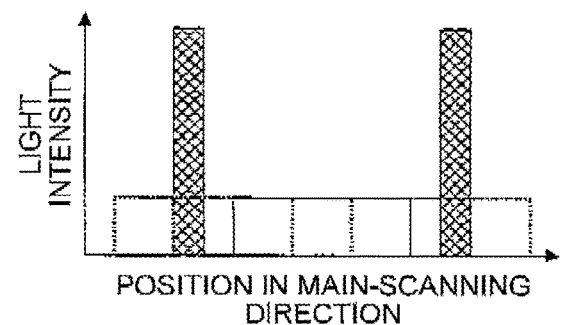

FIG. 9D illustrates a light intensity waveform of an image, in which pixels (e.g., the second pixel from one end in the main-scanning direction and the second pixel from the other end) in the edge portions are formed with 25% duty cycle and 400% of the normal light intensity. In this case, the edge portions are further enhanced. Accordingly, toner scattering can be prevented, which leads to an increase in sharpness and density stabilization.

The laser printer 1000 of the present embodiment described above is an image forming apparatus configured to form an image by scanning the photoconductor drum 1030 with light modulated in accordance with image data (image information). The laser printer 1000 includes the LD 14 and the scanning control device 15 configured to control the LD 14 in accordance with the image data. The scanning control device 15 sets light emission duration (pulse width) of the LD 14 for forming a particular pixel in the image to be shorter than light emission duration (pulse width) of the LD 14 for forming a normal pixel, which is a pixel other than the particular pixel in the image, and sets light emission intensity (pulse amplitude) of the ID 14 for forming the particular pixel to be higher than light emission intensity (pulse amplitude) of the LD 14 for forming the normal pixel.

An image forming method using the laser printer 1000 according to the present embodiment is an image forming method for forming an image by scanning the photoconductor drum 1030 with light modulated in accordance with image data. The image forming method sets light emission duration for forming a particular pixel in the image to be shorter than light emission duration for forming a normal pixel, which is a pixel other than the particular pixel in the image, and sets light emission intensity for forming the particular pixel to be higher than light emission intensity for forming the normal pixel.

As a result, the laser printer 1000 and the image forming method using the laser printer 1000 can prevent forming an image having uneven density.

Figure 10A:
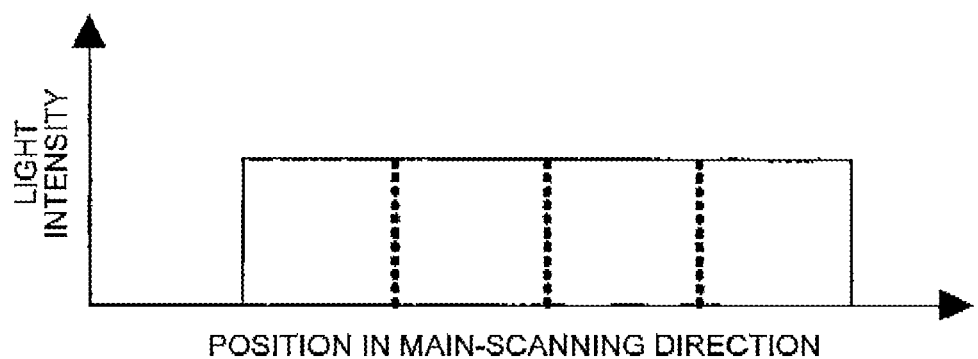
FIGS. 10A and 10B are respectively a graph illustrating light exposure measured at different positions in the main-scanning direction of a photoconductor drum of a comparative example and a graph illustrating variation, in the main-scanning direction, of a developing field on the photoconductor drum of the comparative example.
Figure 10B:
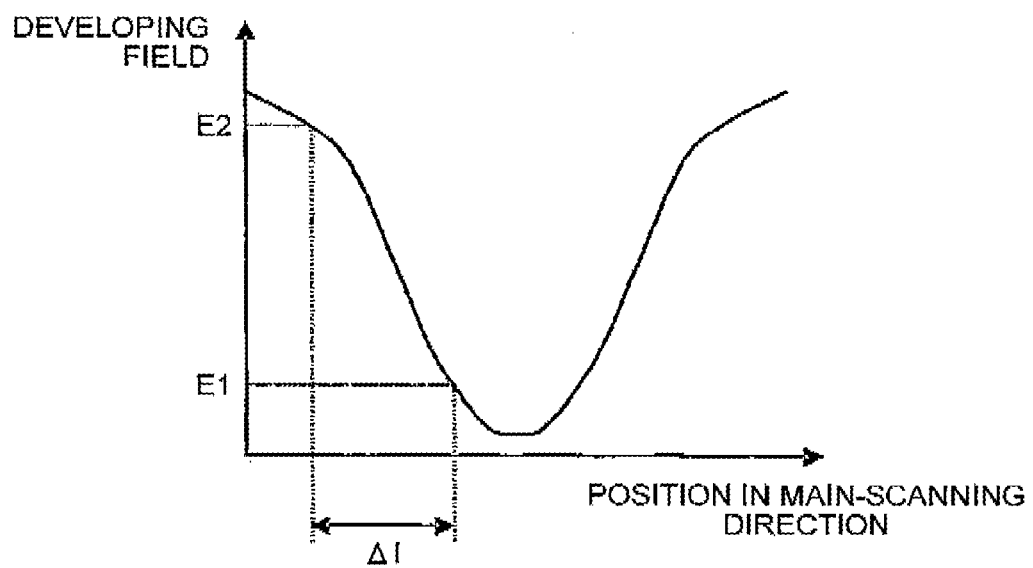

Effects of the laser printer 1000 of the present embodiment are described below by way of specific examples. FIGS. 10A and 10B illustrate a light intensity waveform, with which a photoconductor drum of a comparative example is scanned, and variation of developing field on the photoconductor drum in the main-scanning direction, respectively. As illustrated in FIG. 10A, in the comparative example, the photoconductor drum is scanned in the main-scanning direction with the light intensity waveform of constant light intensity. Consequently, as illustrated in FIG. 10B, there undesirably exists widely (Δ1) an area (the area between E1 and E2), in which electric field is weak and therefore toner deposition is unstable. As a result, because the area where toner deposition is unstable increases, toner is deposited unevenly, which undesirably causes an image formed on recording paper to have uneven density. Furthermore, the uneven toner deposition decreases sharpness at edge portions of a line image(s).

Figure 11A:
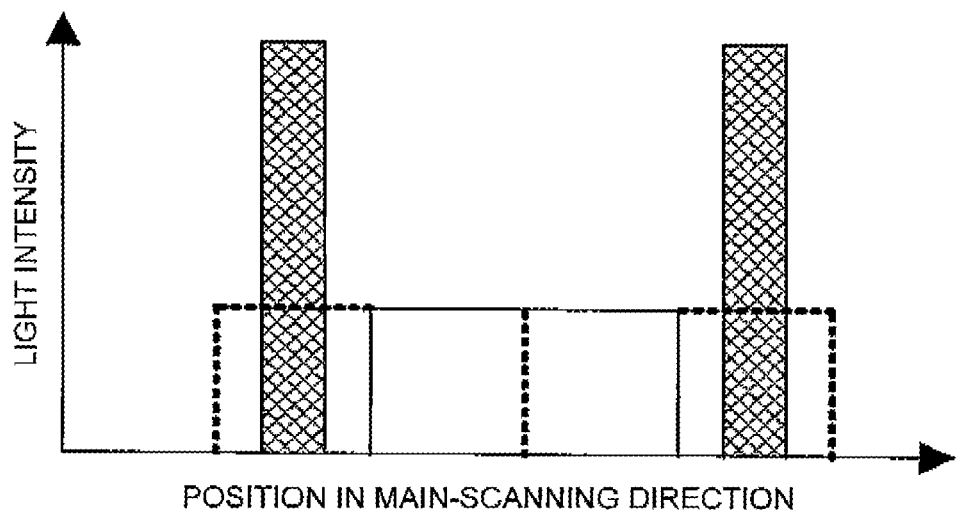
FIGS. 11A and 11B are respectively a graph illustrating light exposure measured at different positions in the main-scanning direction of a photoconductor drum of the present embodiment and a graph illustrating variation, in the main-scanning direction, of a developing field on the photoconductor drum of the present embodiment.
Figure 11B:
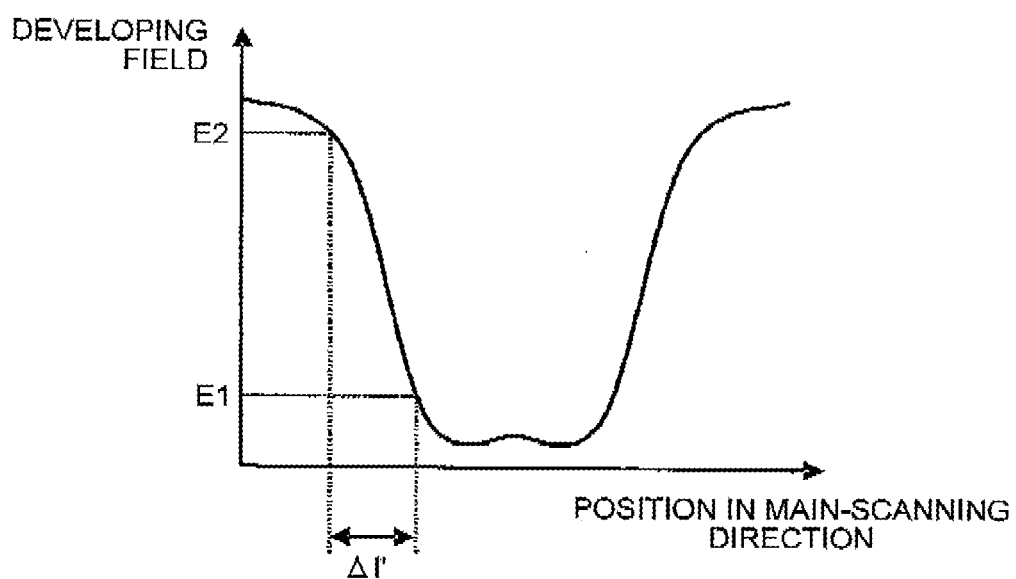

FIGS. 11A and 11B illustrate a light intensity waveform, with which the photoconductor drum of an implementation example of the present embodiment is scanned, and variation of developing field on the photoconductor drum in the main-scanning direction, respectively. Referring to FIG. 11A, because the light emission intensity of the LD 14 for forming pixels of edge portions is set to be higher than that of the LD 14 for forming normal pixels, the developing field changes sharply. Consequently, as illustrated in FIG. 11B, reduction in the distance Δ1' (Δ1) of an area (the area between E1 and E2), in which electric field is weak and therefore toner deposition is unstable, in the main-scanning direction is achieved, whereby the area where toner deposition is unstable can be reduced. As a result, because unevenness in toner deposition is reduced, stability in toner density can be increased. Furthermore, sharpness of edges of a line image(s) can also be increased. In addition, because excessive increase in total exposure energy is avoided by narrowing the pulse width, appropriate total exposure energy can be maintained.

Furthermore, the exposure energy can be maintained substantially constant by making the product of the light emission intensity and light emission duration of the LD 14 forming the each particular pixel approximately equal to the product of light emission intensity and light emission duration of the LD 14 forming the each normal pixel or, put another way, by making the product of the emission duration and the light intensity for forming the each particular pixel approximately equal to the product of the emission duration and the light intensity for forming the each normal pixel.

Additionally, because the particular pixels are included in the edge portions of the image, the sharpness of the edge portions can be increased.

The laser printer 1000 preferably further includes the optical scanning device 1010 configured to scan the photoconductor drum 1030 with light emitted from the LD 14 in the main-scanning direction. The edge portions are preferably edge portions of the image in the main-scanning direction.

The laser printer 1000 configured as described above can reduce density unevenness that would otherwise be caused by variation in the developing field on the photoconductor drum 1030.

The amount of electric current supplied to the LD 14 when forming the particular pixel is preferably N (N>1) times larger than that supplied to the LD 14 when forming the normal pixel. For instance, N is preferably an integer equal to or larger than two. It is preferable to set a current supply period (i.e., pulse width of an electric current pulse) of the LD 14 so as to make the product of the light emission intensity and the light emission duration of the LD 14 forming the particular pixel approximately equal to that of the LD 14 forming the normal pixel.

FIG. 12 illustrates examples of applied current and light waveform responding to the applied current. So long as a light-on period of a laser light source for a single pixel or consecutive pixels is long, the light waveform will not matter. However, if the light-on period for a single pixel is considerably short as illustrated in FIG. 12 or, more specifically, for instance, if laser is modulated at such a high speed that the light-on period for a single pixel is shorter than 10 ns (nanoseconds), response time of the laser light source can inhibit quick response of the light waveform to a drive current. For example, driving a device having a large differential quantum resistance (e.g., a high-current laser, a red laser, or a VCSEL) inevitably develops a large difference between a waveform (the rectangular pulse indicated by the solid line in the top plot of FIG. 12) of the drive current and a light waveform (a light waveform 1' indicated by the dashed line in the second plot of FIG. 12).

To cause the light waveform to quickly respond to the drive current, an applied current 1 (see the top plot of FIG. 12), in which an overshoot current Iov is added to rising edge of a drive current Iop assuming a rectangular pulse shape and an undershoot current Iud is added to falling edge of the drive current Iop, may preferably be applied (supplied) to the laser light source. In this case, such a light waveform as a light waveform 1 indicated by the solid line in the second plot of FIG. 12, which is improved in light waveform to be closer to a square wave, is obtained. That is, an intended light waveform similar to the drive current Iop can be obtained. For this reason, to achieve quick response, it is desirable to apply the applied current 1, illustrated in the top plot of FIG. 12, obtained by adding the overshoot current Iov and the undershoot current Iud to the drive current Iop to the laser light source.

Assume that such a current as an applied current 2 illustrated in the third plot of FIG. 12, which, for example, causes the laser light source to emit light of light emission intensity P1 (a drive current I1) for forming the particular pixel and immediately thereafter changes the light emission intensity to light emission intensity P2 (a drive current I2), which is lower than the light emission intensity P1, for forming the normal pixel, is applied. In this case, because the laser light source does not respond quickly, such a light waveform having a loose curve during fall time as a light waveform 2 indicated by the solid line in the bottom plot of FIG. 12 is undesirably obtained. If a current, which causes the laser light source to emit light of the light emission intensity P2 (the drive current I2) for forming the normal pixel and immediately thereafter changes the light emission intensity to the light emission intensity P1 (the drive current I1) for forming the normal pixel, is applied, because the laser light source does not respond quickly, such a light waveform having a loose curve during rise time as a light waveform 2' indicated by the dashed line in the bottom plot of FIG. 12 is undesirably obtained.

Because looseness of these curves is vulnerable to the light intensity, the environmental temperature, characteristics of the light source, and the like, a stable waveform cannot be obtained.

Hence, as illustrated in FIGS. 6A to 7B, 8B, 8D, and 9B to 9D, when forming a particular pixel and a normal pixel temporally consecutively (in succession), it is desirable not to cause continuous transition from light intensity (high light intensity) for the particular pixel to light intensity (low light intensity) for the normal pixel to occur and not to cause continuous transition from the light intensity (low light intensity) for the normal pixel to the light intensity (high light intensity) for the particular pixel to occur. In short, when forming a particular pixel and a normal pixel temporally consecutively, it is more stable in terms of energy and therefore desirable to cause a laser light source to intermit light emission, rather than to emit light continuously.

More specifically, a light waveform that is stable in energy characteristics can be obtained by, when forming a particular pixel and a normal pixel temporally consecutively, after causing a laser light source to emit light to form any one of the particular pixel and the normal pixel, turning off the laser light source for a short duration, and thereafter causing the laser light source to emit light to form the other one of the particular pixel and the normal pixel.

Accordingly, when a particular pixel and a normal pixel are to be formed temporally consecutively, it is desirable that the control device 13 sets a period, over which a light source (e.g., the LD 14) does not emit light, between a period, in which the particular pixel is formed, and a period, in which the normal pixel is formed.

In the present embodiment described above, the optical scanning device is used as the exposure device, which performs exposure on the photoconductor drum. However, the exposure device is not limited thereto. An optical print head including a plurality of light emitters spaced from each other in at least a direction parallel to the longitudinal direction of the photoconductor drum may alternatively be used Put another way, scanning exposure of the photoconductor drum 1030 may be performed by rotating the photoconductor drum relative to light emitted from the optical print head. In this case, the optical print head may be configured so as to set light emission duration of the light emitter for forming a particular pixel of an image to be shorter than light emission duration of the light emitter for forming a normal pixel, and set light emission intensity of the light emitter for forming the particular pixel to be higher than light emission intensity of the light emitter for forming the normal pixel, for example. With this configuration, the particular pixel is preferably a pixel included in an edge portion of the image and more preferably a pixel included in an edge portion in the rotating direction of the photoconductor drum of the image.

Although the LD (edge-emitting laser) is used as the light source in the present embodiment, the light source is not limited thereto. A laser, such as a VCSEL (vertical-cavity surface-emitting laser), other than the edge-emitting laser, an LED (light-emitting diode), an organic electroluminescent device, or the like may alternatively be used as the light source.

In the present embodiment described above, the pulse width and the pulse amplitude of the light-source-modulation pulse signal for the particular pixel included in the edge portion of the image are adjusted. Alternatively or additionally, the pulse width and the pulse amplitude of the light-source-modulation pulse signal for a particular pixel included in a middle portion of the image may be adjusted as in the case for the edge portion.

In the present embodiment described above, the width of the edge portion of the image is set to the width of one pixel or two pixels. Alternatively, the width may be set to the width of three pixels or wider.

In the present embodiment described above, the light-source control circuit 23 includes the light-source-modulation data generator 29. Alternatively, the image processing unit may include the light-source-modulation data generator 29. In this case, the light-source control circuit may include only the light-source driver 31.

In the present embodiment described above, the laser printer 1000 is adopted as the image forming apparatus according to an aspect of the present invention. However, the image forming apparatus is not limited thereof. For example, the image forming apparatus according to an aspect of the present invention may be a color printer 2000 including a plurality of photoconductor drums as illustrated in FIG. 13, for example.

The color printer 2000 is a tandem multiple-color printer for forming a full-color image by superimposing four colors (black, cyan, magenta, and yellow). The color printer 2000 includes a station for black (a photoconductor drum a charging device K2, a developing device K4, a cleaning unit K5, and a transfer device K6), a station for cyan (a photoconductor drum C1, a charging device C2, a developing device C4, a cleaning unit C5, and a transfer device C6), a station for magenta (a photoconductor drum M1, a charging device M2, a developing device M4, a cleaning unit M5, and a transfer device M6), and a station for yellow (a Photoconductor drum 11, a charging device Y2, a developing device Y4, a cleaning unit Y5, a transfer device Y6), an optical scanning device 2010, a transfer belt 2080, and a fixing unit 2030.

Figure 13:
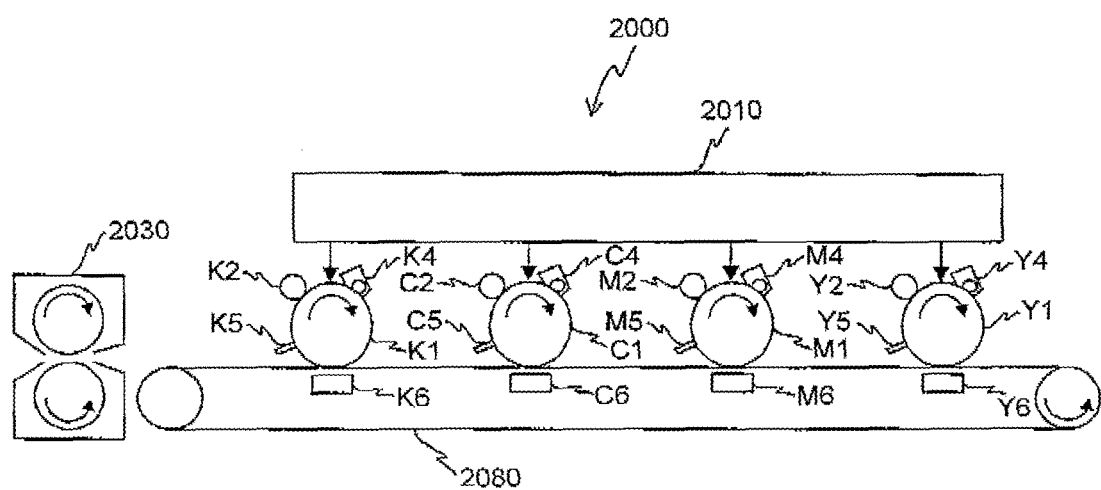
FIG. 13 is a diagram illustrating a schematic configuration of a color printer.

Each of the photoconductor drums rotates in the direction indicated by the arrows in FIG. 13. The charging device, the developing device, the transfer device, and the cleaning unit are arranged around each of the photoconductor drums. Each of the charging devices uniformly charges the surface of a corresponding one of the photoconductor drums. The optical scanning device 2010 irradiates the charged surfaces of the photoconductor drums with laser light, thereby forming latent images on the photoconductor drums toner image is formed on the surface of each of the photoconductor drums by a corresponding one of the developing devices. Furthermore, each toner image of the corresponding color is transferred onto recording paper on the transfer belt 2080 by a corresponding one of the transfer devices. The fixing unit 2030 finally fixes the toner images onto the recording paper.

The optical scanning device 2010 includes an LD similar to the LD 14 of the embodiment described above for each of the colors and a light-source control circuit, which is similar in configuration to the light-source control circuit 23, for controlling the LDs. Hence, the optical scanning device 2010 can provide advantages similar to those provided by the optical scanning device 1010 and, furthermore, can reduce occurrence of out of color registration. Furthermore, by virtue of including the optical scanning device 2010, the color printer 2000 can provide advantages similar to those provided by the laser printer 1000.

The color printer 2000 described above is configured integral with the optical scanning device; however, the configuration of the color printer 2000 is not limited thereto. For example, the optical scanning device may alternatively be provided for each of the image forming stations or, further alternatively, the optical scanning device may be provided for each two of the image forming stations.

The color printer 2000 described above has the four photoconductor drums; however, the number of the photoconductor drums is not limited thereto. For example, the color printer 2000 may include five or more photoconductor drums.

The image forming apparatus according to en aspect of the present invention may be an image forming apparatus configured to directly irradiate a photosensitive color-changing medium (e.g., paper) with laser light.

The image forming apparatus according to an aspect of the present invention may be an image forming apparatus using a silver halide film as the image bearer. In this case, a latent image is formed on the silver halide film by optical scanning. The latent image can be processed into a visible image by a process similar to a developing process performed in typical silver halide photography. The visible image can be transferred onto photographic paper by a process similar to a printing process performed in typical silver halide photography. Such an image forming apparatus can be implemented as an optical prepress apparatus or an optical image-rendering apparatus for rendering CT (computerized tomographic), scan images or the like.

The present invention is applicable not only to the laser printer and the color printer described above but also to image forming apparatuses such as digital copiers. In short, the present invention is applicable to any image forming apparatus for forming an image by performing scanning exposure on an image bearer (e.g., a photoconductor drum) with light modulated in accordance with image information.

According to an aspect of the present invention, density unevenness that would otherwise develop in a formed image can be prevented.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus for forming an image by scanning an image bearer with light modulated in accordance with image information, the image forming apparatus comprising:
   a light source configured to emit the light; and
   circuitry configured to:
      control the light source in accordance with the image information,
      set light emission duration of the light source for forming a particular pixel in the image to be shorter than light emission duration of the light source for forming a normal pixel, the normal pixel being a pixel other than the particular pixel in the image,
      set light emission intensity of the light source for forming the particular pixel to be higher than light emission intensity of the light source for forming the normal pixel, and
      selectively set a phase of the particular pixel.

2. The image forming apparatus according to claim 1, wherein
   a product of the light emission intensity and the light emission duration of the light source for forming the particular pixel is approximately equal to a product of the light emission intensity and the light emission duration of the light source for forming the normal pixel.

3. The image forming apparatus according to claim 1, wherein
the particular pixel is a pixel included in an edge portion of the image.

4. The image forming apparatus according to claim 3, wherein
   the edge portion is an edge portion in a main-scanning direction of the image.

5. The image forming apparatus according to claim 1, wherein
   the circuitry is configured to detect the particular pixel based on an attribute of the image indicated by the image information.

6. The image forming apparatus according to claim 1, wherein
   an amount of electric current supplied to the light source when forming the particular pixel is N (N>1) times larger than an amount of electric current supplied to the light source when forming the normal pixel.

7. The image forming apparatus according to claim 1, wherein,
   when the particular pixel and the normal pixel are to be formed temporally consecutively, the control device interposes a period, over which the light source does not emit light, between a period, in which the particular pixel is formed, and a period, in which the normal pixel is formed.

8. The image forming apparatus according to claim 1, wherein the light source includes a surface emitting laser.

9. The image forming apparatus according to claim 1, wherein the phase of the particular pixel is set towards a center of the image.

10. The image forming apparatus according to claim 6, wherein said N is determined based on characteristics of the image bearer, toner, and developing.

11. The image forming apparatus according to claim 5, wherein the attribute of the image includes at least one of a text, a picture, and a shape.

12. An image forming method for forming an image by scanning an image bearer with light modulated in accordance with image information, the image forming method comprising:
   emitting, by a light source, the light;
   controlling the light source in accordance with the image information;
   setting light emission duration of the light source for forming a particular pixel in the image to be shorter than light emission duration of the light source for forming a normal pixel, the normal pixel being a pixel other than the particular pixel in the image;
   setting light emission intensity of the light source for forming the particular pixel to be higher than light emission intensity of the light source for forming the normal pixel; and
   selectively setting a phase of the particular pixel.

* * * * *